United States Patent Office 3,606,935
Patented Sept. 21, 1971

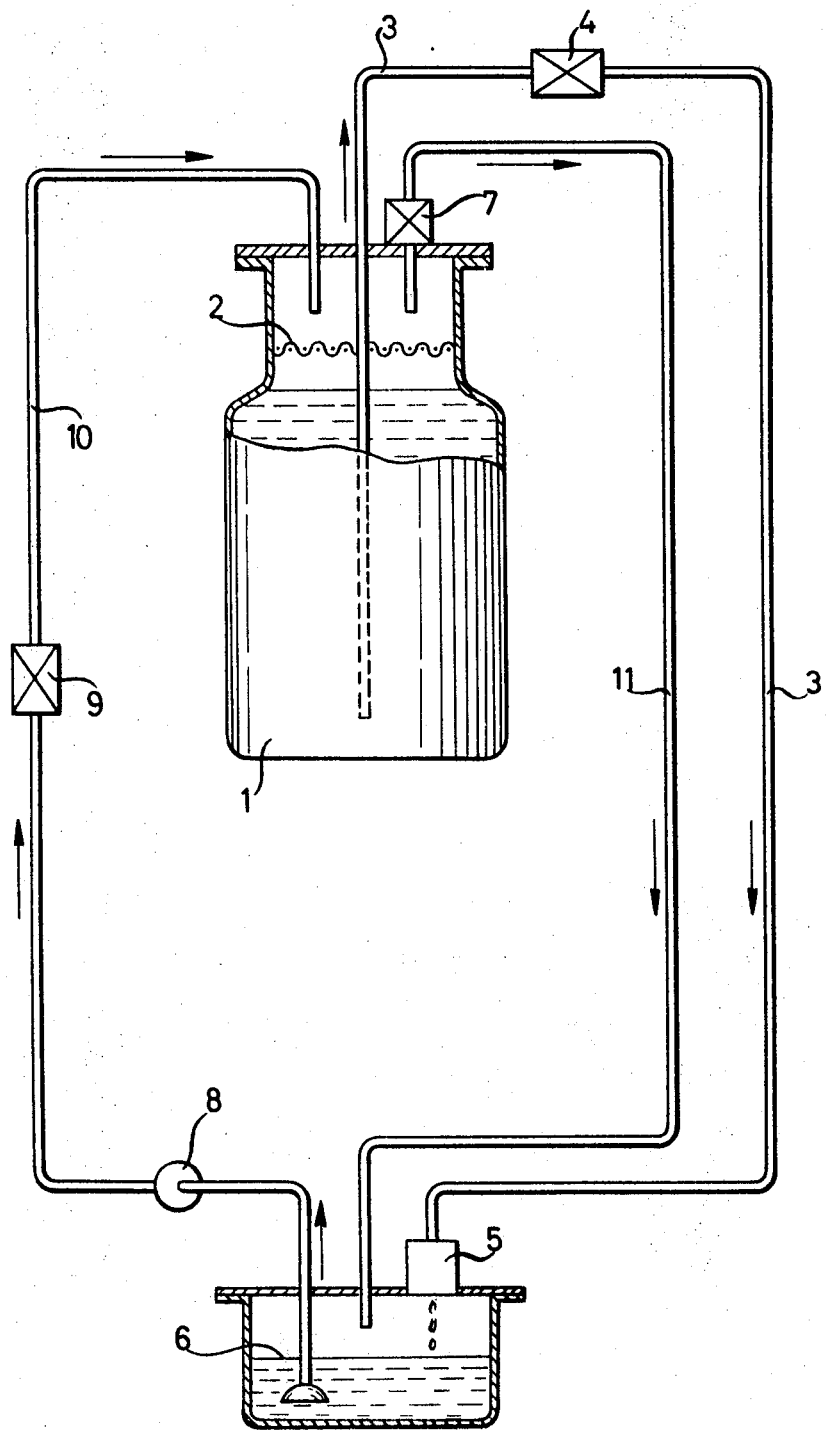

3,606,935
LUBRICATING SYSTEM FOR INTERNAL COMBUSTION ENGINES
Veit John, Wiesbaden, Germany, assignor to Farbwerke Hoechst Aktiengesellschaft vormals Meister Lucius & Bruning, Frankfurt am Main, Germany
Filed Mar. 11, 1969, Ser. No. 806,054
Claims priority, application Germany, Mar. 16, 1968, F 55,086
Int. Cl. F01m 1/18
U.S. Cl. 184—6.1                5 Claims

ABSTRACT OF THE DISCLOSURE

The lubricating system for internal combustion engines, particularly of automobiles, consists of an interchangeable tank for the oil, a dry sump and a pump sucking therefrom. Under the pressure produced by the pump in the tank, the oil flows to the lubricating points. In order to prevent that the lubricating system is without pressure during the pauses of the pump a non-return valve is inserted between the pump and the tank and a stop valve between the tank and the lubricating points.

---

The present invention relates to a lubricating system for internal combustion engines, particularly for internal combustion engines of automobiles.

Besides other lubricating systems there have already been proposed the pure circulating forced lubrication and the dry sump lubrication. The former is particularly used for lubricating internal combustion engines of automobiles, the latter for lubricating large Diesel-plants and aeroplane engines.

In the case of the pure circulating forced lubrication the oil is contained in an oilpan mounted in or at the casing bottom of the engine, pumped therefrom to the lubricating points and, from these lubricating points, flows back to the oilpan. The oil contents of the pan and, consequently, the size of the latter must be dimensioned in a manner such that even under complicated driving conditions, for example braking, cornering or hill-climbing, there is such an amount of oil in the pan that the pump does not idle. To this effect, the multiple of the amount of oil actually necessary for lubricating is necessary. Furthermore, the relatively complicated oil change is disadvantageous, as the oilpan must be rendered accessible and special devices for catching the oil are necessary. It is also disadvantageous that lubrication only begins after a certain running time of the engine, that is after a certain pressure has been built up in the lubricating system. During this time, the bearings run without lubrication and are subjected to an increased wear.

In the case of the dry sump lubrication the oil is pumped from a tank to the lubricating points, collected in the dry sump and pumped back to the tank. In this lubricating system, the amount of oil needed is not so critical as in the circulating forced lubrication, but also this system has all the disadvantages mentioned.

Now, I have found a lubricating system for internal combustion engines, consisting of a tank, a dry sump and a pump sucking therefrom, in which the tank is interchangeable and under pressure at least in the operating condition.

It is advantageous to mount a non-return valve in the oil line between the pump and the tank, and a stop valve in the oil line between the tank and the lubricating points. Thus, the pressure is maintained during the pauses of the engine so that before starting the engine a sufficient pre-lubrication takes place.

It may be advantageous to provide the tank with a filter bed on the pump side for holding back impurities.

For the lubrication in accordance with the invention, the oil pressure, produced by the pumps already used in the known systems, is sufficient. In order to avoid elevated pressures and, consequently, the opening of the safety valve in the pump, which would interrupt the supply of oil it is advantageous to insert a safety valve in the pressure side, preferably in the gas zone, of the lubricating system, which opens under a pressure by about ½ atmosphere gauge inferior to the maximum pressure produced by the pump.

The invention is illustrated diagrammatically by way of example in the accompanying drawing.

After opening the stop valve 4, the oil being under pressure leaves the interchangeable tank 1 and flows via the pipe line 3 to the lubricating points 5. It is collected in the dry sump 6 and is then pumped by pump 8 via the pipe line 10, in which a non-return valve 9 is inserted, to the tank 1, in which a filter bed 2 may be disposed. The pump 8 is either electrically driven or, in usual manner, by the engine. On the cover of the tank 1, a combined safety air relief valve 7 is mounted, emptying into a pipe line 11. The pipe line 11 may empty into the dry sump 6.

When using the lubricating system in automobiles, it is advantageous to couple the stop valve 4 with the circuit of the primary coil. After closing the circuit, lubrication starts immediately because of the pressure in the tank 1.

An oil change in the lubricating system in accordance with the invention is carried out by simply exchanging the tank, but it may also be carried out by a simple exchange of the contents.

What is claimed is:

1. An internal combustion engine lubricating system containing air and lubricating fluid therein comprising a dry sump, reservoir means for containing pressurized air and substantially all of the lubricating fluid in said system, pump means for drawing lubricating fluid and air from said dry sump to said reservoir, non-return valve means between said pump and said reservoir for permitting lubricating fluid and air to flow from said pump to said reservoir and for preventing flow of lubricating fluid and air from said reservoir to said pump, conduit means connecting said reservoir to said engine, and check valve means in said conduit being selectively operable for maintaining the air and lubricating fluid in said reservoir under pressure in cooperation with said non-return valve means while preventing lubricating fluid and air flow through said conduit between said reservoir and said engine when said engine is shut off and for permitting lubricating fluid to flow through said conduit from said reservoir to said engine immediately prior to the first turn of said engine and while the engine is still running.

2. A lubricating system as in claim 1 wherein said pump is an electric pump.

3. A lubricating system as in claim 1 wherein said reservoir means is removably connected to said system.

4. A lubricating system as in claim 3 including an air relief valve mounted on said reservoir.

5. A lubricating system as in claim 3 wherein said reservoir includes a filter bed.

References Cited

UNITED STATES PATENTS

| | | | |
|---|---|---|---|
| 2,357,606 | 9/1944 | Nutt | 184—6A |
| 2,526,197 | 10/1950 | Cannon et al. | 184—6I |
| 1,090,773 | 3/1914 | Winton | 184—6 |
| 1,847,817 | 3/1932 | Cole | 184—6 |
| 2,430,097 | 11/1947 | Bauer | 184—6 |
| 2,691,429 | 10/1954 | Kovacs | 184—6 |

FOREIGN PATENTS

| | | | |
|---|---|---|---|
| 145,273 | 7/1920 | Great Britain | 184—6I |
| 145,273 | 7/1920 | Great Britain | 184—6I |

MANUEL A. ANTONAKAS, Primary Examiner

U.S. Cl. X.R.

184—6.13